May 7, 1963 H. W. GROTEWOLD 3,088,582
FRUIT PREPARATION MACHINE
Filed June 28, 1960 5 Sheets-Sheet 1
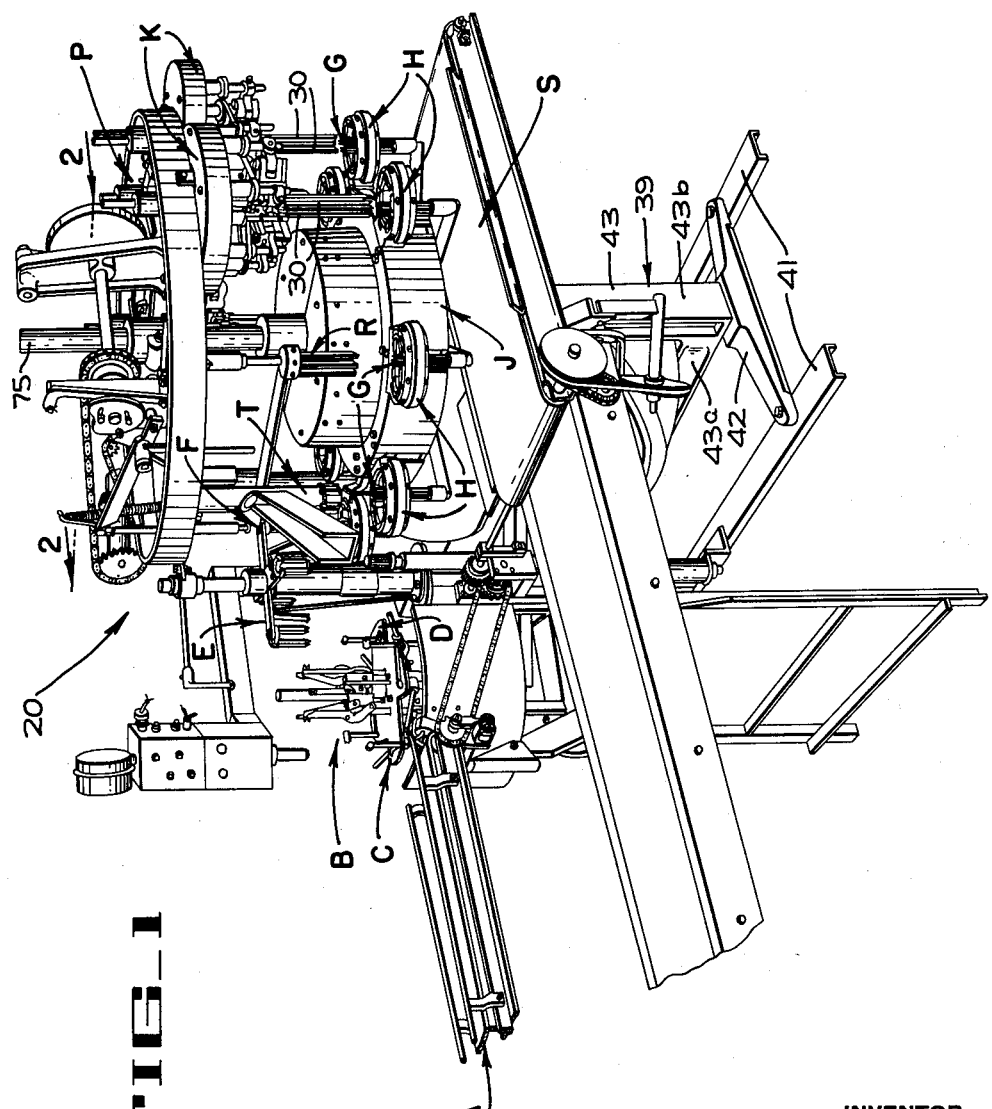
FIG_1
INVENTOR
HANS W. GROTEWOLD
BY Hans G. Hoffmeister
ATTORNEY

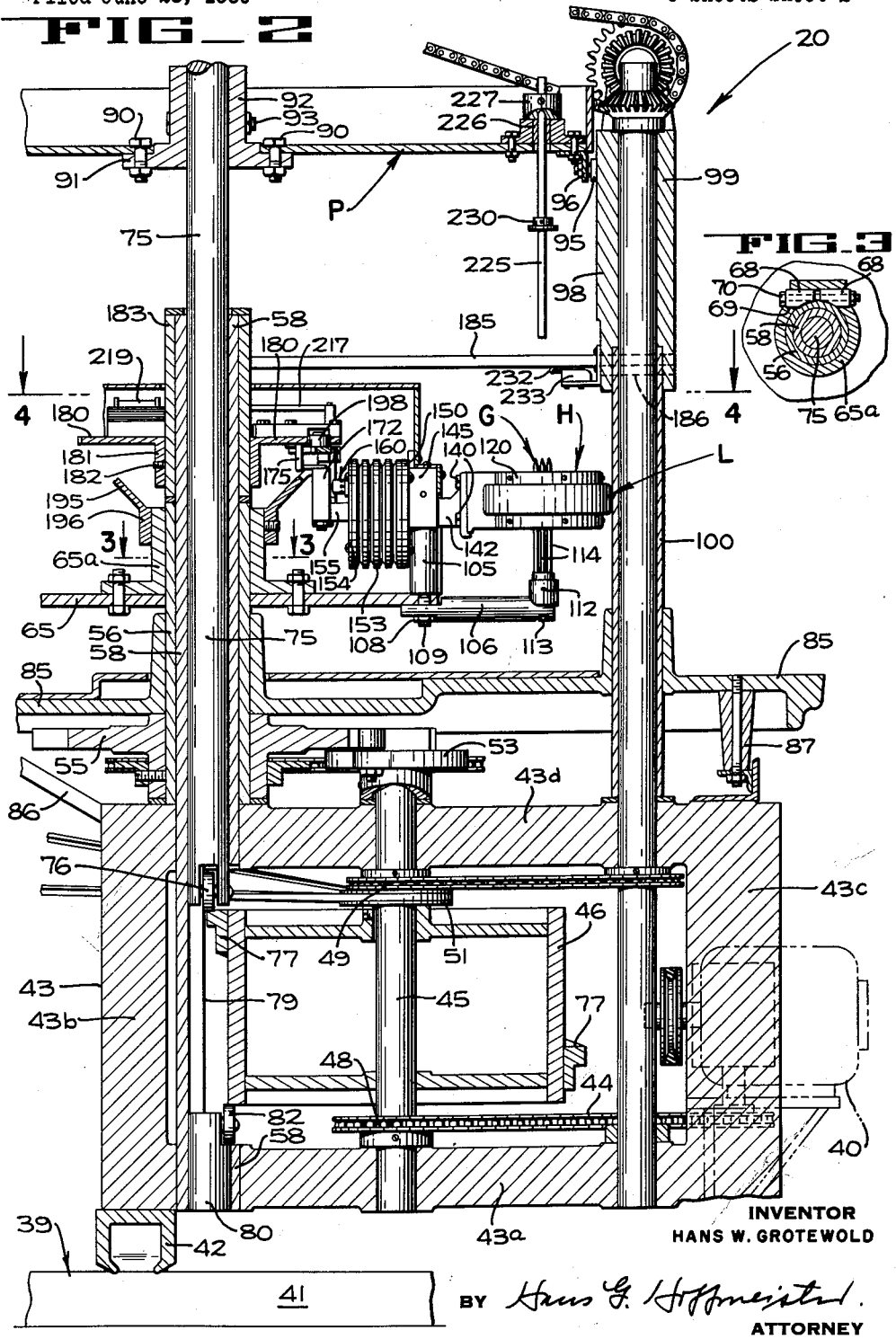

May 7, 1963 H. W. GROTEWOLD 3,088,582
FRUIT PREPARATION MACHINE
Filed June 28, 1960 5 Sheets-Sheet 3
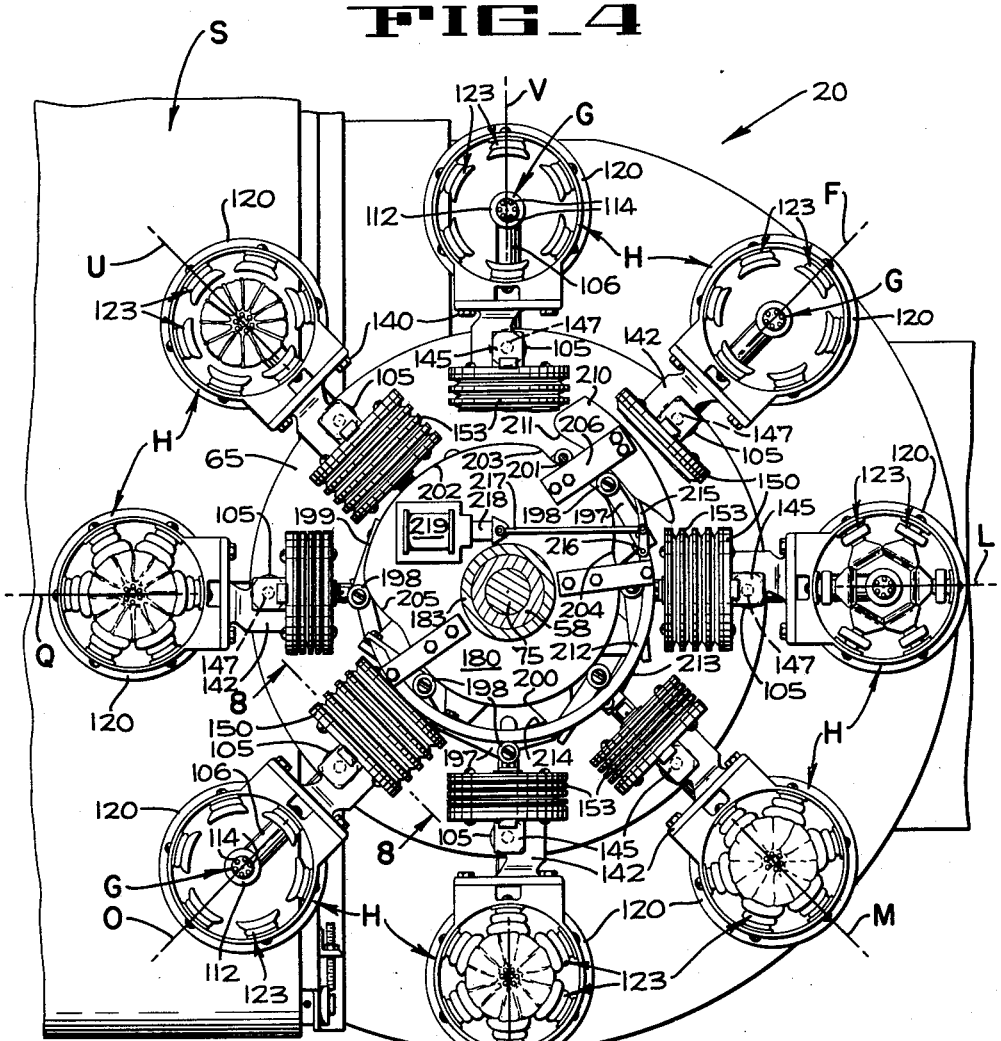
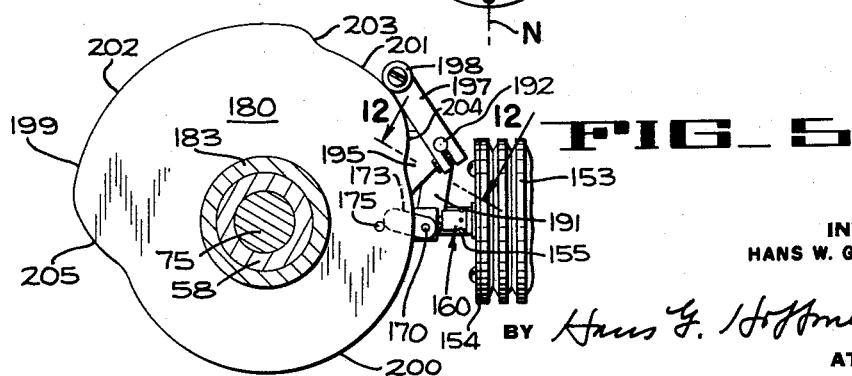
INVENTOR
HANS W. GROTEWOLD
BY
ATTORNEY May 7, 1963  H. W. GROTEWOLD  3,088,582
FRUIT PREPARATION MACHINE
Filed June 28, 1960  5 Sheets-Sheet 4
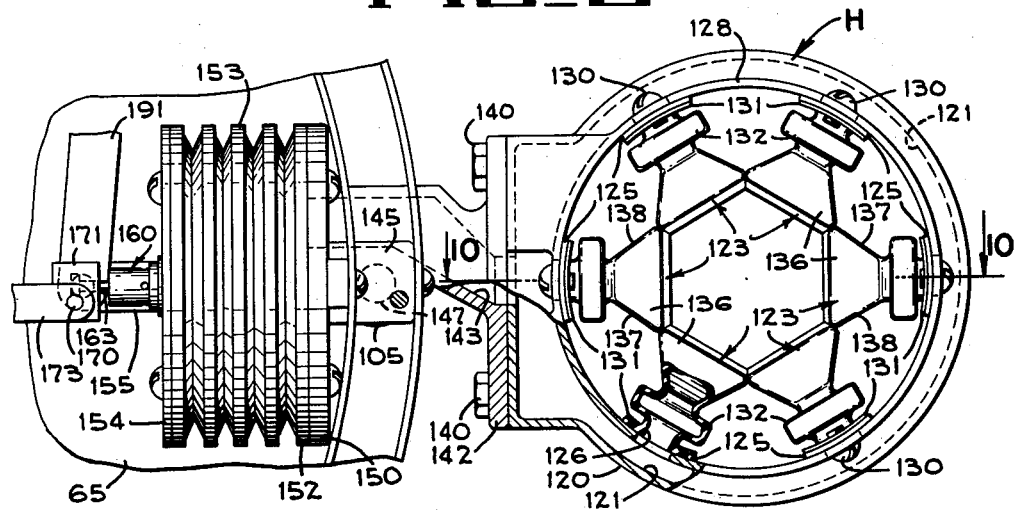
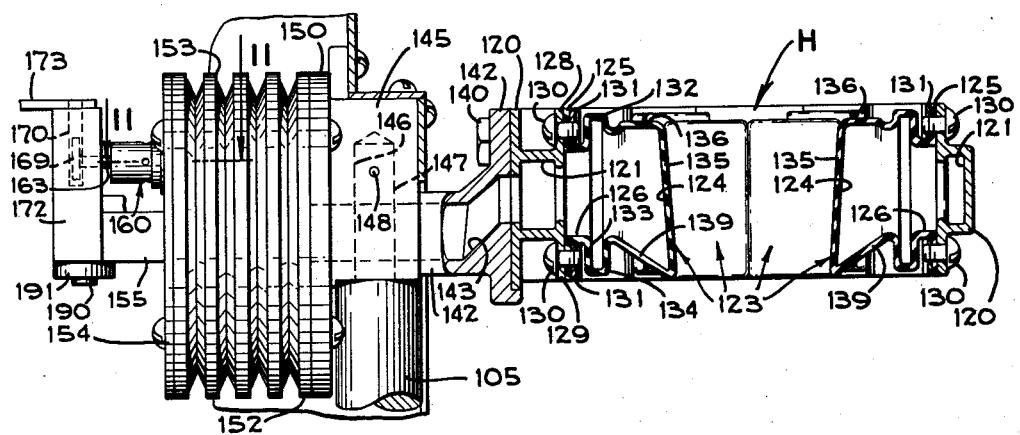
INVENTOR
HANS W. GROTEWOLD
BY Hans G. Hoffmeister
ATTORNEY May 7, 1963 H. W. GROTEWOLD 3,088,582
FRUIT PREPARATION MACHINE
Filed June 28, 1960 5 Sheets-Sheet 5
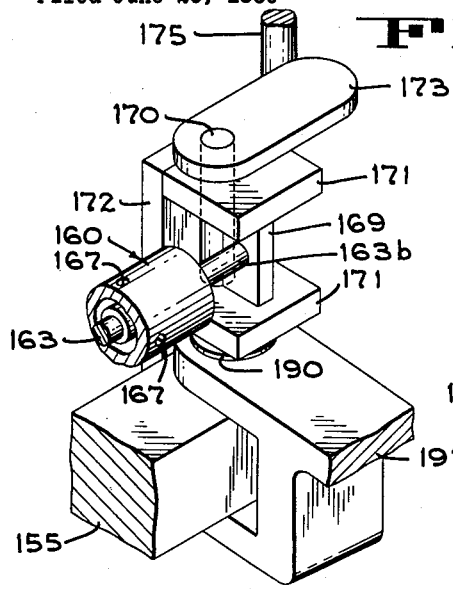
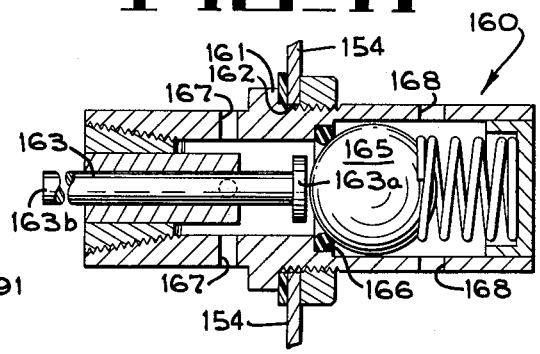
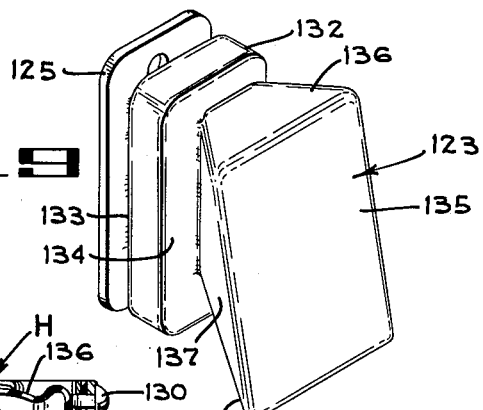
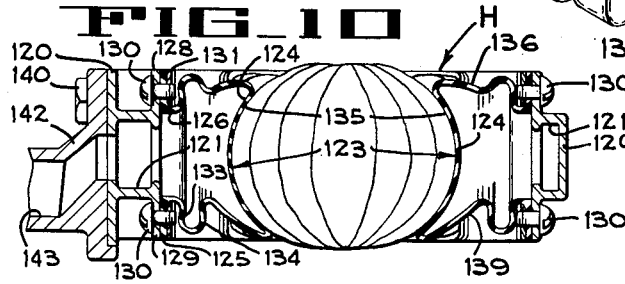
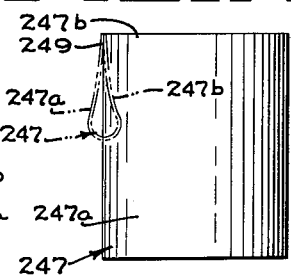
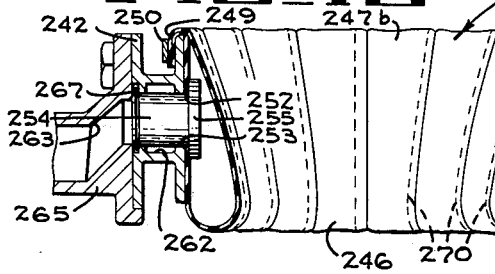
INVENTOR
HANS W. GROTEWOLD
BY
ATTORNEY United States Patent Office 3,088,582
Patented May 7, 1963

3,088,582
FRUIT PREPARATION MACHINE
Hans W. Grotewold, Sebring, Fla., assignor to FMC Corporation, a corporation of Delaware
Filed June 28, 1960, Ser. No. 39,270
11 Claims. (Cl. 198—210)

This invention pertains to fruit preparation machines, and more particularly relates to apparatus for holding fruit in fixed position as it is subjected to the action of processing devices in a fruit processing machine.

In the processing of certain types of fruit, such as citrus fruit, knives or probes are moved through the fruit from top to bottom to loosen seeds or to separate meat segments of the fruit from the membranes to which they are naturally bonded. Fruit carriers provided heretofore have made use of horizontal bands which encircle and grip the fruit during the downward movement of the instruments through the fruit. While such bands do hold the fruit in compact condition and prevent the parts from separating, these bands do not provide support for the underside of the fruit. Accordingly, quite frequently the lower end portions of the fruit are broken off when the blades or probes exert a downward force on these lower portions. It is therefore an object of the present invention to provide a fruit holder capable of holding the fruit in fixed position and providing support for the lower portions of the fruit.

Another object is to provide an improved apparatus for processing fruit.

Another object is to provide an efficient system for controlling the expansion and contraction of a pneumatic fruit holder.

Other and further objects of the invention will become apparent from the following description taken in connection with the accompanying drawings, in which:

FIGURE 1 is a more or less diagrammatic perspective of a fruit processing machine incorporating the improved fruit holders of the present invention.

FIGURE 2 is an enlarged fragmentary vertical section taken along line 2—2 of FIGURE 1.

FIGURE 3 is a reduced horizontal section taken along line 3—3 of FIGURE 2.

FIGURE 4 is a horizontal section taken along line 4—4 of FIGURE 2.

FIGURE 5 is an enlarged horizontal section, similar to FIGURE 4, and showing a cam actuated mechanism separated from the rest of the mechanism.

FIGURE 6 is an enlarged plan of a portion of the turret of FIGURE 4, with parts broken away.

FIGURE 7 is an elevation of the mechanism of FIGURE 6, with parts shown in section.

FIGURE 8 is a perspective of a portion of the turret of FIGURE 4 with parts shown in section, the view being taken looking approximately in the direction indicated by arrows 8—8 of FIGURE 4.

FIGURE 9 is a perspective of a pneumatic fruit gripping member of the fruit holder of the present invention.

FIGURE 10 is a vertical section taken along line 10—10 of FIGURE 6, particularly showing the fruit holder in gripping and supporting engagement with a fruit.

FIGURE 11 is an enlarged section taken along line 11—11 of FIGURE 7 through a vent valve.

FIGURE 12 is an enlarged fragmentary perspective of a vent valve actuating mechanism, the view being taken approximately on line 12—12 of FIGURE 5.

FIGURE 13 is a vertical section through a second embodiment of the fruit holder of the present invention.

FIGURE 14 is a plan of the inflatable element of the fruit holder of FIGURE 13, said element being shown before it is folded into the form shown in FIG. 13.

Although the fruit holder of the present invention is useful generally for holding fruits in any machine wherein the fruit must be held in fixed position as it is acted on by processing tools, it is particularly adapted for use in a grapefruit sectionizing machine 20 (FIG. 1) of the type disclosed in the copending application of Hans W. Grotewold, Serial No. 730,335. The machine 20 of FIG. 1 is substantially identical to that disclosed in the above-identified application except that the improved fruit holder and associated mechanism of the present invention has been substituted in the machine 20 for the band-type fruit holder, used in the machine of said application, and its actuating mechanism. Accordingly, reference may be had to the above-identified application for a complete description of any mechanisms not fully described hereinafter.

In general, the grapefruit sectionizing machine of FIG. 1 comprises a supply conveyor A on which peeled and treated grapefruit are advanced to a position within reach of an operator, who stands in front of a feed turret B and places each grapefruit on the feed turret at station C of the turret. The feed turret B is intermittently moved through 90° angular increments in a clockwise direction to bring each grapefruit to a transfer station D where the grapefruit is automatically transferred from the feed turret to a transfer turret E which is also arranged to be intermittently moved in 90° increments in synchronism with the movements of feed turret B, but in a counterclockwise direction. The grapefruit is then moved to a second transfer station F where it is deposited in one of a plurality of fruit carrier prong units G around which is disposed the improved fruit holder H of the present invention. The fruit carriers G are mounted on a main turret J which is arranged to be intermittently moved through 45° angular increments in a clockwise direction to move a grapefruit, held on the main turret, successively into operative association with four sectionizing heads K, two only being illustrated. These four heads are carried by and project downwardly from a vertically movable tool carrier or top plate P. Each head has a plurality of blades 30 arranged to be moved down into a grapefruit to separate the pie-shaped meat segments from the grapefruit core and from the radial membranes. The sectionized grapefruit, with the separated segments disposed around the core, is then brought under a rotary spinner or stripper unit R that wraps the radial membranes around the stationary core, causing any remaining bond between the membranes and the segments to be completely broken and causing the segments to drop onto a discharge conveyor S. The core is then moved to a position under a core stripping mechanism T which removes the core from the machine.

The construction and operation of the supply conveyor A, the feed turret B, and the transfer turret E are fully described in the above-mentioned application Serial No. 730,335. The main turret J is mounted on a base 39 comprising two spaced base channels 41, two spaced transverse bars 42 (one only being shown) that are secured to the channels 41, and a vertical frame 43 which is fixed to the bars 42 and projects upwardly therefrom. The frame includes a bottom member 43a (FIG. 2), two side members 43b and 43c and a top member 43d. A vertical shaft 45, on which a barrel cam 46 is keyed, is journalled for rotation in the top and bottom members 43d and 43a. A drive sprocket 48, which is driven by motor 40 through chain 44, is keyed to shaft 45 between the lower end of the barrel cam 46 and the member 43a, and a driven sprocket 49 is keyed to shaft 45 between the top member 43d of frame 43 and the barrel cam. A pulley 51 and a driver 53 of a Geneva drive mechanism are also secured to shaft 45. The Geneva driver is arranged to periodically engage and rotate a Geneva gear 55 that is keyed to a tubular shaft 56 which is rotatably journalled around a guide shaft or tube 58. Near its lower end, the second shaft 58 is fixed, as by setscrews, in both the bottom frame member 43a and the top member 43d.

A turret plate 65 is provided with a hub 65a that is clamped around the tubular shaft 56 for rotation therewith by means of two gripper blocks 68 (FIG. 3) which are slidable in a transverse opening 69 in the hub and are arranged to be forced into gripping engagement with shaft 56 by a bolt 70. A vertically reciprocable shaft 75, which is slidable in the tubular shaft 58, carries at its lower end a roller 76 which rides along the upper surface of a cam track 77 provided on the periphery of the barrel cam 46. The lower end of the vertical shaft 75 is also slidably journalled on the inner wall of the fixed guide tube 58 which has a cut-away portion 79 into which the cam track 77 projects. A block 80 is secured to the lower portion of tube 58 and carries a roller 82 which is disposed in supporting contact with the lower surface of barrel cam 46. A table 85 is disposed immediately below the turret plate 65, being supported at opposite marginal edges by brackets 86 and 87 secured to the base frame member 43d.

The above mentioned tool carrier or top plate P is secured by bolts 90 to a circular flange 91 that has a hub 92 clamped to the vertically movable shaft 75 by a bolt 93 which actuates gripper blocks (not shown) that are identical to the blocks 68 (FIG. 3). Therefore, when shaft 75 is reciprocated in a vertical direction, as the roller 76 rides along cam track 77, the top plate P is also reciprocated vertically. The top plate is guided during its vertical reciprocating movement by two spaced rollers 95 (one only being shown) which are mounted on a bracket 96 secured to the top plate. The rollers ride along oppositely facing vertical, flat wall portions formed on an extended portion 98 of a tubular bearing member 99 that is supported from the base frame 43 by a tubular support member 100.

The turret plate 65 has eight upstanding posts 105 (FIGS. 2 and 4) mounted in equally spaced relation around its outer periphery. Directly below each post 105, a support arm 106 (FIG. 2) extends radially outwardly from the under surface of the plate 65. Each post 105 and its associated support arm 106 are held in fixed posiiton by a nut 108 that is threaded on a stud 109 projecting downwardly from the post 105 through suitable openings in the plate 65 and in the support arm 106. One of the before-mentioned fruit carrier prong units G is mounted on the outer end of each arm, said unit comprising an upstanding prong holder 112 which is secured by a capscrew 113 to the outer end of the arm 106. A circular formation of prongs 114 (FIG. 4) are fixed in and project upwardly from the prong holder 112.

One of the improved fruit clamping and holding units H of the present invention is associated with each fruit carrier. Each fruit holder H comprises a rigid annular metal support frame 120 (FIGS. 6 and 7) which has a generally circular conduit or passage 121 formed in its wall. Six expandable and contractible fruit gripping members 123 are mounted at equi-spaced points on the innner periphery of the annular frame. Each member 123 is made of a material, such as natural or synthetic rubber, so that it can be expanded when pressurized air is directed to its inner hollow chamber 124 and can be collapsed when suction pressure is applied to the inner chamber. Referring to FIGS. 6, 7, and 9, it will be noted that each member 123 has a generally rectangular flange 125 formed around an opening 126 which communicates with the annular conduit 121. The flange 125 is secured in air-tight engagement with tabs 128 and 129 of the support ring 120 by capscrews 130 which extend through flange 125 and engage threaded plates 131. After passing through the opening 126, air entering the chamber 124 passes through a bellows portion 132 of the gripper member, said bellows having two oppositely bent sections 133 and 134. Adjacent the bellows section 134 and forwardly therefrom, the gripper has a forward wall 135, a flat upper wall 136, opposed inwardly directed side walls 137 and 138, and a bottom wall 139, that is directed downwardly and forwardly, as seen in FIGURE 7. The forward wall 135 of each gripper slants downwardly and inwardly toward the axis of the support ring so that, as seen in FIG. 9, the lower portion of each gripper may be expanded outwardly to move part way under the fruit to furnish support for the lower end of the fruit. The ring 120 is connected by capscrews 140 (FIGS. 6 and 7) to a mounting bracket 142 which has an internal passage 143 communicating with the annular conduit 121. An offset, upstanding projection 145 of the bracket 142 has a bore 146 that snugly receives a reduced diameter rod-like member 147 that projects up from the top of the adjacent post 105. A roll pin 148 secures the member 147 to the bracket projection 145.

The bracket 142 is also provided with a cylindrical flange 150 to which one end 152 of a bellows 153 is secured. The other end of the bellows is secured to a circular plate 154 which has a square shaft 155 projecting outwardly from its center.

It will be evident that, since the annular mounting ring 120 and the six gripper members 123 are mounted in fixed position, the contraction of the bellows 153, from a normal position it assumes upon being vented to atmosphere, will cause air to be pumped into the gripper members, causing them to expand into gripping and supporting relation with a gragefruit held on the assoicated prong unit G as seen in FIG. 2. Expansion of the bellows from the normal vented position will cause air to be withdrawn from the gripper members causing them to collapse.

In order to vent the bellows, a vent valve 160 (FIGS. 6 and 7) is mounted in the circular end plate 154 at the inner end of each of the bellows 153. Each valve 160 has a housing 161 (FIG. 11) that is disposed in air-tight engagement in an opening 162 in the plate 154. A push rod 163 is slidably journalled in the valve housing and has a end 163a disposed inside the housing in engagement with a spring loaded ball valve 165. It will be evident that, when the rod 163 is moved inwardly into the housing, the ball valve 165 will be moved from its rubber O-ring seat 166 and the inside of the bellows will be vented to atmosphere through ports 167 and 168 in the valve housing. The push rod 163 has an outer end portion 163b (FIG. 12) disposed against a plate 169 that is secured to a pivot pin 170 journalled in two spaced support members 171 that are welded to a flat bar 172 projecting upwardly from the square bar 155 carried by the inner end plate 154 of the bellows. The upper support member 171 slidably supports a link 173 that is keyed to the pivot pin 170 and is arranged to engage a fixed actuator rod 175 which, as best seen in FIGS. 2 and 5, projects downwardly from a cam plate 180. When the link 173 engages the actuator rod 175, the pivot pin 170 is rotated and the plate 169 engages the push rod 163 and forces it inwardly of the valve housing to vent the associated bellows.

The contraction and expansion of each bellow 153 is controlled by the cam plate 180 (FIG. 4) which has a hub 181 (FIG. 2) secured by setscrew 182 to a tubular sleeve 183. The sleeve 183 is disposed over the fixed shaft 58 and is held against rotation by a flat bar 185 that is secured to the sleeve and to a flange 186 projecting from bearing 99. The cam plate 180 is thus held in fixed position while the several bellows 153 move in a circular path around the cam plate.

As seen in FIG. 8 the square shaft 155, that is secured to and projects from the inner end of each bellow, is pivotally connected at 190 to one end of a short link 191. The other end of the link is secured to a vertical shaft 192 that is rotatably journalled in a vertical bearing 193 formed on the periphery of a plate 195 which, as seen in FIG. 2, has a central cylindrical portion 196 secured to the hub 65a of the turret 65. One vertical bearing 193 is provided for each bellow and, since both the bearings 193 and the bellows are carried by the turret, the bearings do not move relative to the bellows. A second link 197 (FIG. 8) is secured to the upper end of each vertical shaft 192, and a follower roller 198 is rotatably mounted on the outer end of the link and is disposed in contact with a camming surface 199 (FIGS. 4 and 5) formed by the peripheral edge of the cam plate 180.

The peripheral camming surface 199 of the cam plate 180 (FIG. 5) has an inner portion 200, an intermediate portion 201 and an outer portion 202, the outer portion 202 being farther from the axis of shaft 75 than the inner portion 200. The bellows move in a clockwise path around the cam plate 180, and any follower roller 198 on the outer cam portion 202 must move along a transition portion 203 to reach intermediate cam section 201, and along a transition section 204 to reach the inner cam portion 200. Similarly, the roller must travel over a third transition section 205 in moving from the inner portion 200 to the outer portion 202. A guide plate 210 (FIG. 4), fixed to plate 180 by a rigid strap 206, is disposed generally opposite the intermediate camming section 201 to define a confining cam track 211 for the roller as it moves along intermediate section 201. Similarly, a guide member 212 is supported from cam plate 180 and is disposed opposite the inner cam portion 200 to define a second confining track 214 for the roller. The outer edge 213 of the guide member 212 provides an auxiliary camming edge which is disposed at the same distance from the axis of shaft 75 as is the outer cam portion 202.

It is to be particularly noted that, if the roller is disposed in the cam track 214 between the inner cam edge portion 200 and the guide 212, the associated bellows will be contracted and the pneumatic fruit holders will be expanded into gripping engagement with the grapefruit as shown by the bellows at station N. If the follower is moving along either the outer camming edge 202 or the camming edge 213 on the guide member 212, the bellows will be expanded and the fruit holder collapsed as shown by the bellows at station O (FIG. 4). When the roller is traveling in cam track 211, the bellows will be in a neutral position.

A diverting gate 215 (FIG. 4) is disposed opposite transition section 204. The gate is pivotally mounted at 216 on the fixed guide member 212 and is arranged to be pivoted by an actuator rod 217 that is pivotally connected to the gate and to the plunger 218 of a solenoid 219 which is mounted on cam plate 180. When the gate is in the normal position shown in FIG. 4, the follower roller 198 will move into the cam track 214 to contract the bellows and expand the fruit holder. When the diverting gate is pulled to the left (FIG. 4) so that its free end engages the cam plate 180, the roller will be guided outwardly to a position in contact with the outer auxiliary cam edge 213, and the bellows will be expanded and the fruit holders deflated and drawn in toward the inner surface of the holder ring 120.

As previously mentioned, the turret is arranged to be intermittently moved in angular increments of 45°. During this movement each fruit carrier prong unit 114 and the associated pneumatic fruit holder of the present invention is brought to the transfer station F (FIG. 4) where a grapefruit is impaled on the prong unit while the turret is stationary. When the turret is next moved, the fruit holder is brought to a fruit detecting station L where a fruit-detecting rod 225 (FIG. 2), which is mounted on the tool plate P, is moved down into the prong unit 114 as the plate P moves down, to determine whether or not a grapefruit is positioned inside the fruit holder. If no grapefruit is in the holder, the detector energizes the solenoid 219 to operate the diverting gate and cause the roller 198 associated with the empty fruit holder, to be diverted to the outer cam surface 213. As a result, the fruit holder will not be inflated and the blades of the sectionizing units at stations M, N, O, and Q will not puncture the fruit holder.

The detector rod 225 (FIG. 2) is slidably disposed in a bushing 226 carried by the plate P and has a weighed collar 227 setscrewed to its upper end to cause it to assume the normal, downwardly projecting position of FIG. 2. Intermediate the ends of rod 225 a switch actuator collar 230 is secured to the rod. If there is a grapefruit in the pneumatic holder when the plate P is lowered, the lower end of the rod will engage the grapefruit and the downward movement of the rod will be arrested although the plate P continues downwardly. In this arrested position, the actuator collar 230 is still disposed at a higher elevation than an actuating arm 232 of a switch 233 mounted on the bearing 99. Accordingly, if there is a grapefruit in the holder, the switch will not be actuated and the diverting gate 215 will remain in the normal position of FIG. 4. However, if there is no grapefruit in the holder, the detector rod 225 will move down into the cup and the collar 230 will engage the switch arm 232 and actuate the switch 233 which is connected in the control circuit of the solenoid 219 controlling the diverting gate 215. When the switch is actuated, the solenoid is energized and the gate is swung to the left (FIG. 4) to divert the roller to the auxiliary camming edge 213 causing the bellows to be expanded and the pneumatic fruit holders to be contracted and drawn in close to their support ring 120 as shown by the holder at station O in FIG. 4.

When the machine is put into operation, the main turret J is intermittently moved through 45° increments of angular movement. As each fruit holder unit H comes to rest at station F, a grapefruit is automatically deposited therein. At this time, the follower roller 198 of the associated inflation control mechanism is riding on the outer cam portion 202 and, accordingly, the pneumatic gripping members 123 are deflated to facilitate the positioning of the grapefruit on the prongs 114 within the holder. As the fruit holder is moved to station L, the follower roller 198 moves into the cam track 211 causing the bellows to be moved to the neutral position. Also, the lever 173 (FIG. 5) engages pin 175 to vent the bellows. While the holder is stopped at station L, the detector rod 225 moves down toward the center of the holder. If there is a grapefruit in the machine, the solenoid 219 will not be energized and the diverting gate 215 will remain in the position of FIG. 4 so that the roller 198 will be directed into the cam track 214 during the next indexing movement of the turret. If there is no grapefruit in the holder, the diverting gate will be actuated and the roller 198 will be guided to the auxiliary cam surface 213 causing the bellows to be expanded and held in expanded condition during subsequent indexing movements of the turret.

If there is grapefruit in the holder and the roller is directed into cam track 214, the bellows will be contracted and the grippers will be expanded into gripping and supporting engagement with the grapefruit as the holder moves to station M which is the station at which the first sectionizing head K is located. The grippers will hold and support the fruit until station U is reached. Just as the holder reaches station U, its associated roller 198 rides up transition section 205 causing the expansion of the bellows and retraction of the grippers from engagement with the grapefruit. Station U is the station at which the spinner R is located and, accordingly, it is desirable that the gripping engagement of the holder with the fruit be relaxed at this station. The fruit holder will be fully deflated by the time it reaches station V, and will be retained in this condition until the bellows is moved to neutral position the next time the roller 198 moves into cam track 211.

In FIG. 13 a second embodiment 240 of the pneumatic fruit holder of the present invention is illustrated. This fruit holder comprises a rigid metal ring 242 having a peripheral air passage 244 formed therein. The inflatable gripper member 246 of the holder is made by folding the lower half 247a (FIG. 14) of a tube 247 up over the upper half 247b. When the tube is thus folded, it is positioned in the rigid ring 242 and the upper end is folded over to form a flange 249 and is disposed over the ring and clamped in place by a clamping ring 250. An opening 252 is provided in the tube 247 opposite an air port 253 in the ring 242. A short conduit 254 of nylon or the like, is disposed in the opening 252 and a collar 255, formed in the inner end of the conduit, is disposed interiorly of the member 246, being glued to the inner surface of the tube around the opening 252. When the inflatable member is first positioned in the ring 242, the conduit 254 is projected through air port 253 and is disposed in a passage 262 which communicates with an air supply passage 263 in a bellows mounting bracket 265. The outer end of the conduit 254 is secured by a spring clip 267 to the ring 242.

It will be evident that several longitudinally extending overlapping flaps 270 are formed in the inner wall of the inflatable member 246. These flaps permit the holder to assume a substantially flat position when air is withdrawn from the inside of the holder and permit the inner surface of the member to be moved inwardly into gripping engagement with a grapefruit.

While only one air inlet is illustrated for the inflatabel gripper, it will be understood that several such inlets may be provided, in which case conduits, similar to conduit 254, would establish flow communication between the annular air passage 244 and the inside of the gripper. The conduit 254 would, of course, be shorter than shown in FIG. 13, so that air could circulate in the air passage 244.

While the formation of this generally cylindrical inflatable gripper 246 from a tube 247 has been described, it is within the scope of the present invention to form the member in other ways, as by folding a sheet of rubber material or the like in half to form an elongated generally tubular member having abutting side edges, forming the clamping flange 249, and two open ends. The elongated member may then be bent into a circular form so that the two open ends can be secured together, as by gluing or fusing, to define the circular inflatable gripper.

From the foregoing description it is seen that the present invention provides a new efficient fruit holder that is capable of not only gripping the fruit but also providing support for the lower portion of the fruit. The vent valve and its actuating mechanism assures that each inflatable fruit holder will be in a completely normal condition just before it is inflated. This return to normal operation eliminates the objectionable features of a closed air system which causes an excessive amount of air to build up in certain inflatable members and, in case of leakage, causes a deficiency of air in certain grippers. Further, the uses of the detector rod and the diverting gate of the present invention makes possible the use of inflatable grippers in association with blades that are capable of puncturing the grippers.

It will be understood that modifications and variations may be effected without departing from the scope of the novel concepts of the invention.

Having thus described the invention, what I claim as new and desire to protect by Letters Patent is:

1. In a fruit processing machine, a fruit holder comprising a rigid support ring, a plurality of inflatable members mounted in said ring at spaced points around the inner periphery of said ring, each member having an inner face slanted donwwardly and inwardly toward the axis of said ring and terminating in a lower edge having end portions adapted to be moved into close proximity to the end portions of the faces of adjacent members to define a substantially continuous fruit gripping surface for enclosing a fruit, and means for directing air under pressure into said members to inflate said members and move said inner face into engagement with a fruit in said ring, the lower inner end of each slanted face being movable to a position under the fruit to support the fruit.

2. In a fruit processing machine a turret mounted for rotation, a rigid ring mounted on said turret, inflatable gripping means mounted in said ring and having inner wall means movable toward the center of said ring upon inflation of said gripping means, a bellows mounted on said turret adjacent said ring, means providing flow communication between said inflatable gripping means and said bellows, fixed cam means adjacent said turret, a linkage mounted on said turret having one end movable generally radically of said turret into engagement with said bellows and the other end movable into engagement with said cam during rotation of said turret, and means for rotating said turret to move said linkage into engagement with said cam, said cam means having a first camming surface adapted to actuate said linkage in one direction to effect contraction of said bellows and movement of air into said inflatable members to move said inner wall means inwardly of said into gripping engagement with a fruit in said ring, and a second camming surface adapted to actuate said linkage in an opposite direction to expand said bellows and deflate said members.

3. In a fruit processing machine, a turret mounted for rotation, a cam mounted adjacent said turret, a bellows mounted on said turret, an inflatable gripper mounted on said turret, means communicating said gripper with said bellows so that compression of said bellows causes inflation of said gripper and expansion of said bellows causes deflation of said gripper, a bellows actuating linkage connected to said bellows and movable in a first direction generally radially of said turret to compress said bellows and in a second direction radially of said turret to expand said bellows, a cam follower carried by said linkage, means defining two camming surfaces on said cam, and means for guiding said cam follower onto a selected one of said two camming surfaces, movement of said follower along one of said cam surfaces being effective to actuate said linkage to compress said bellows and movement of said follower along the other camming surface being effective to actuate said linkage to expand said bellows.

4. In a fruit processing machine, a turret mounted for rotation, a cam mounted adjacent said turret, a bellows mounted on said turret, an inflatable gripper mounted on said turret, means communicating said gripper with said bellows so that compression of said bellows causes inflation of said gripper and expansion of said bellows causes deflation of said gripper, a bellows actuating linkage connected to said bellows and movable in a first direction to compress said bellows and in a second direction to expand said bellows, a cam follower carried by said linkage, means defining two camming surfaces on said cam, a movable gate disposed in the path of movement of said cam follower and arranged for movement between two control positions for guiding said follower onto one or the other of said camming surfaces, movement of said follower along one of said cam surfaces being effective to actuate said linkage to compress said bellows and movement of said follower along the other camming surface being effective to actuate said linkage to expand said bellows, detector means movable into the vicinity of the center of said inflatable gripper to engage a fruit in said gripper for moving said gate between said two positions, and means actuated by said detector and connected to said gate moving means for shifting said gate to one of said two positions in response to the presence of an article in said inflatable gripper.

5. In a fruit processing machine, a turret mounted for rotation, a bellows mounted on said turret, an inflatable fruit gripper communicating with said bellows and arranged to be expanded at a predetermined angular position of said turret into gripping engagement with a fruit when said bellows is compressed, a vent valve connected to said bellows to vent said bellows upon being actuated, an actuating member disposed adjacent said turret, and means connected to said vent valve and arranged to be actuated by said actuating member during rotation of said turret to open said valve to vent said bellows before said predetermined angular position of said turret is reached.

6. In a fruit processing machine, a turret mounted for rotation, a bellows mounted on said turret, an inflatable fruit gripper communicating with said bellows and arranged to be expanded into gripping engagement with a fruit when said bellows is compressed, means for compressing said bellows during rotation of said turret, a vent valve connected to said bellows to vent said bellows upon being actuated, a linkage mounted on said turret and operatively connected to said vent valve, a stationary abutment disposed adjacent said turret in the path of movement of said linkage, and means for rotating said turret to move said linkage into engagement with said abutment to vent said bellows prior to compression of said bellows.

7. In a fruit processing machine, a turret mounted for rotation, a rigid ring mounted on said turret, inflatable grippers mounted inside said ring and having inner surfaces movable toward the center of said ring when said grippers are inflated, a bellows mounted on said turret, means providing flow communication between said bellows and said inflatable grippers, fixed cam means adjacent said turret, means for rotating said turret, means operatively connected between said bellows and said cam means for compressing said bellows at a predetermined point during rotation of said turret to force air into said inflatable grippers to move said inner surfaces into engagement with a fruit disposed in said ring, a vent valve connected to said bellows, and means operatively connected between said valve and said cam means for actuating said valve to vent said bellows prior to compression of said bellows.

8. In a fruit processing machine, a fruit holder comprising a rigid support ring, a plurality of inflatable gripper members mounted in spaced relation on the inner surface of said ring, and means for directing air under pressure into said members to expand said members and move them into gripping engagement with a fruit in said ring each inflatable gripper having an inner fruit-contacting face movable inwardly toward the center of said ring independently of the movement of the faces of adjacent grippers whereby each gripper adapts itself to the configuration and position of the portion of the surface of the fruit that it engages.

9. In a fruit processing machine, a fruit holder comprising a rigid support ring, an inflatable gripper member mounted on said ring and having a generally cylindrical inner surface movable inwardly toward the center of said ring during inflation of said member, said inner surface having overlapping folds extending generally parallel to the axis of the ring and permitting said member to be drawn close against said ring when said member is deflated, and means for directing air into said inflatable member to move said inner surface into gripping engagement with a fruit in said ring.

10. In a fruit processing machine having a fruit inspection station and a processing station, and having a plurality of overhead processing tools mounted at the processing station for reciprocating movement in a vertical direction to process a fruit, the combination of a turret, a rigid ring mounted on said turret, an annular inflatable gripper mounted inside said ring, means for intermittently moving said turret through predetermined angular increments to move said annular gripper successively to the inspection station and the processing station, said annular gripper being arranged to receive said vertically moving tools at said processing station and having an inner surface arranged to be moved inwardly toward the axis of the ring into gripping engagement with a fruit in said ring upon inflation of said inflatable gripper, means at said inspection station for detecting the presence or absence of a fruit in said ring, and means actuated by said detecting means for selectively directing air into said inflatable gripper before it reaches the processing station to expand said gripper when there is a fruit in the associated ring whereby to hold the fruit in fixed position to receive the vertically moving tools at said processing station, or for drawing air out of said gripper to deflate said gripper when there is no fruit in the ring and move said gripper out of the path of movement of the tools at the processing station.

11. In a fruit processing machine having an inspection station and a work station and having vertically movable processing tools at the work station, a turret, a rigid ring mounted on said turret, mens for intermittently moving said turret through predetermined increments of angular movement to position said ring successively at said stations, an inflatable generally cylindrical gripper mounted inside said ring and adapted when at the work station to receive the vertically moving tools, said gripper having an inner surface arranged to be moved inwardly toward the axis of the ring upon inflation of said gripper, means at the inspection station for detecting the pressure or absence of a fruit in said ring before said ring reaches the work station, and means actuated by said detecting means for directing air under pressure into said gripper when there is a fruit in said ring.

References Cited in the file of this patent

UNITED STATES PATENTS

| | | |
|---|---|---|
| 828,865 | Spain | Aug. 14, 1906 |
| 2,730,149 | Aguilar | Jan. 10, 1956 |
| 2,775,279 | Perrelli | Dec. 25, 1956 |
| 2,932,378 | Smith | Apr. 12, 1960 |
| 2,987,179 | Allgeyer | June 6, 1961 |